United States Patent

[11] 3,574,270

| [72] | Inventor | Guenter Rosendahl<br>Arlington Heights, Ill. |
|---|---|---|
| [21] | Appl. No. | 762,749 |
| [22] | Filed | Sept. 26, 1968 |
| [45] | Patented | Apr. 13, 1971 |
| [73] | Assignee | Illinois Tool Works, Inc. |

[54] PACKAGING MACHINE
13 Claims, 19 Drawing Figs.

[52] U.S. Cl. .................................................. 53/281,
141/190, 198/25, 198/211
[51] Int. Cl. ................................................... B65b 3/12
[50] Field of Search .......................................... 53/167,
184, 185, 250, 160, 266, 281, 282; 141/190, 191;
198/209, 211, 25

[56] References Cited
UNITED STATES PATENTS

| 2,712,717 | 7/1955 | Keller | 53/184X |
| 2,932,330 | 4/1960 | Donofrio | 141/190X |
| 3,221,472 | 12/1965 | Groth et al | 53/184 |
| 3,242,636 | 3/1966 | Evanson et al | 53/266 |
| 3,452,512 | 7/1969 | Inman | 53/282 |
| 3,464,182 | 9/1969 | Nichols | 53/281 |

*Primary Examiner*—Theron E. Condon
*Assistant Examiner*—Robert L. Spruill
*Attorneys*—Olson, Trexler, Wolters and Bushnell, Robert W. Beart, Michel Kovac, Barry L. Clark and Jack R. Halvorsen

ABSTRACT: There is disclosed a machine for filling and assembling a plurality of packages which are initially interconnected and are then severed from each other. The machine is adapted to package food products such as milk and parts thereof including means for advancing containers, means for dispensing material into the containers, means for sealing the containers and means for severing containers from each other and actuating mechanisms therefor are constructed so as to be readily assembled and serviced and so as to facilitate cleaning of the entire apparatus.

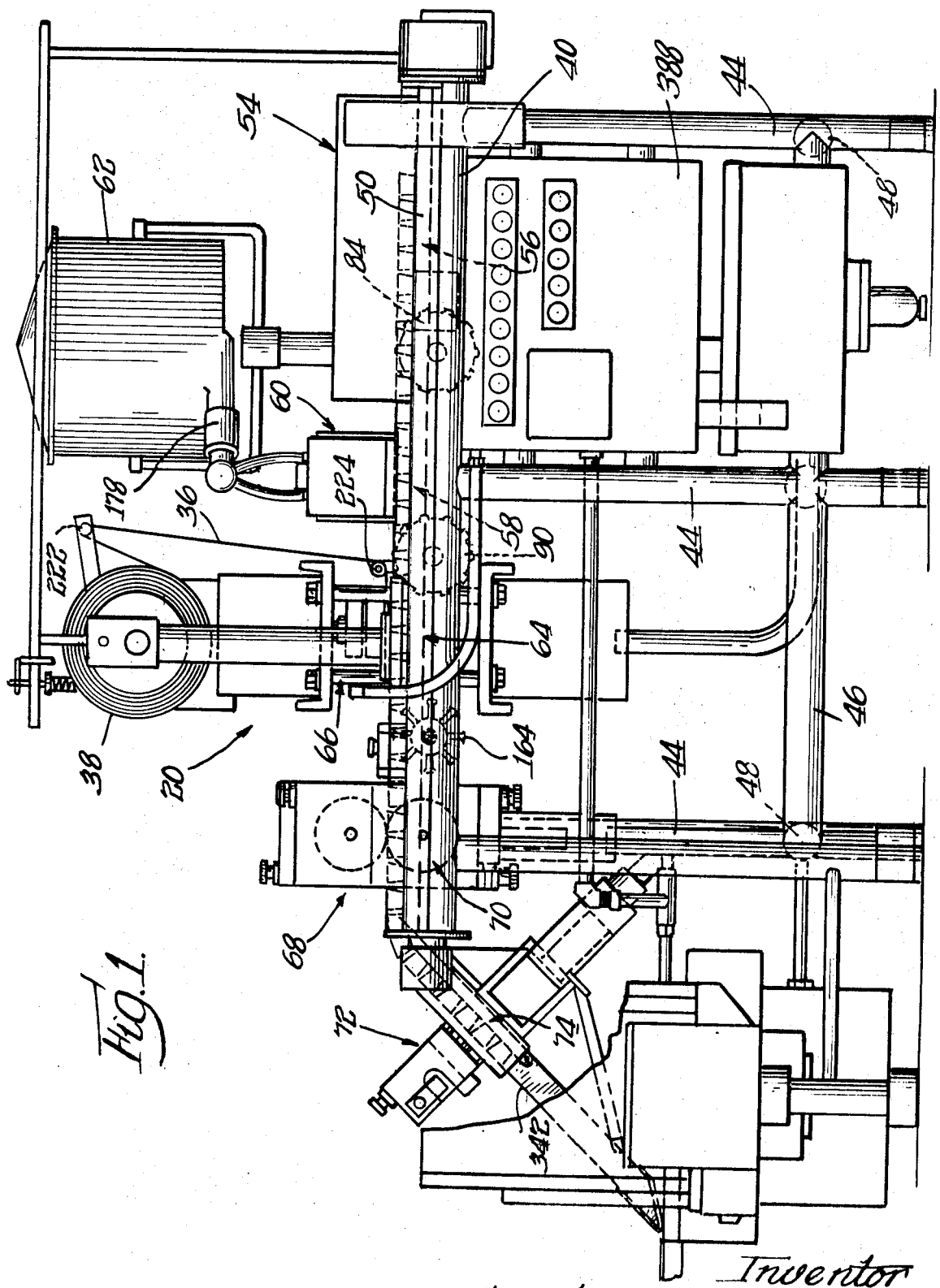

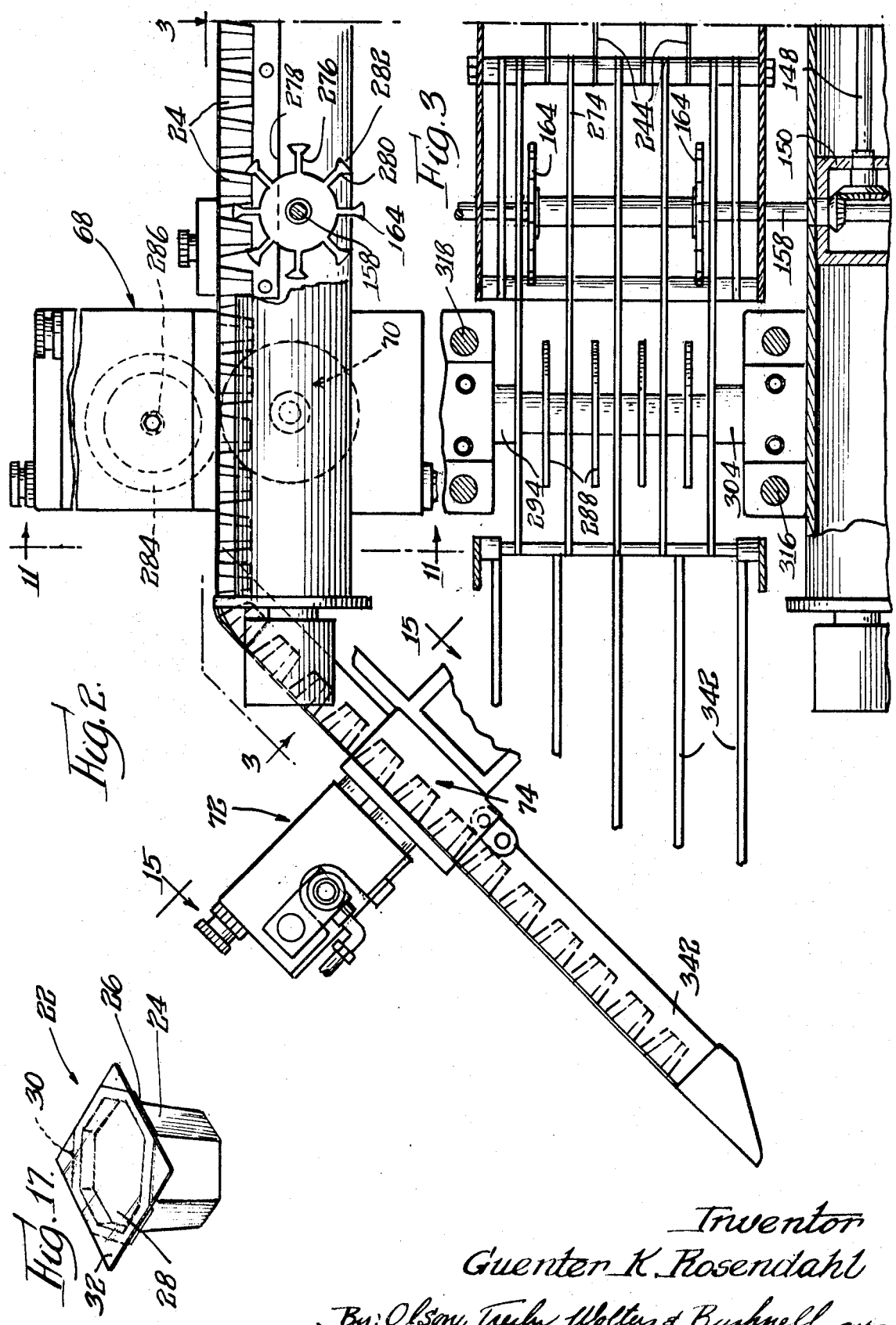

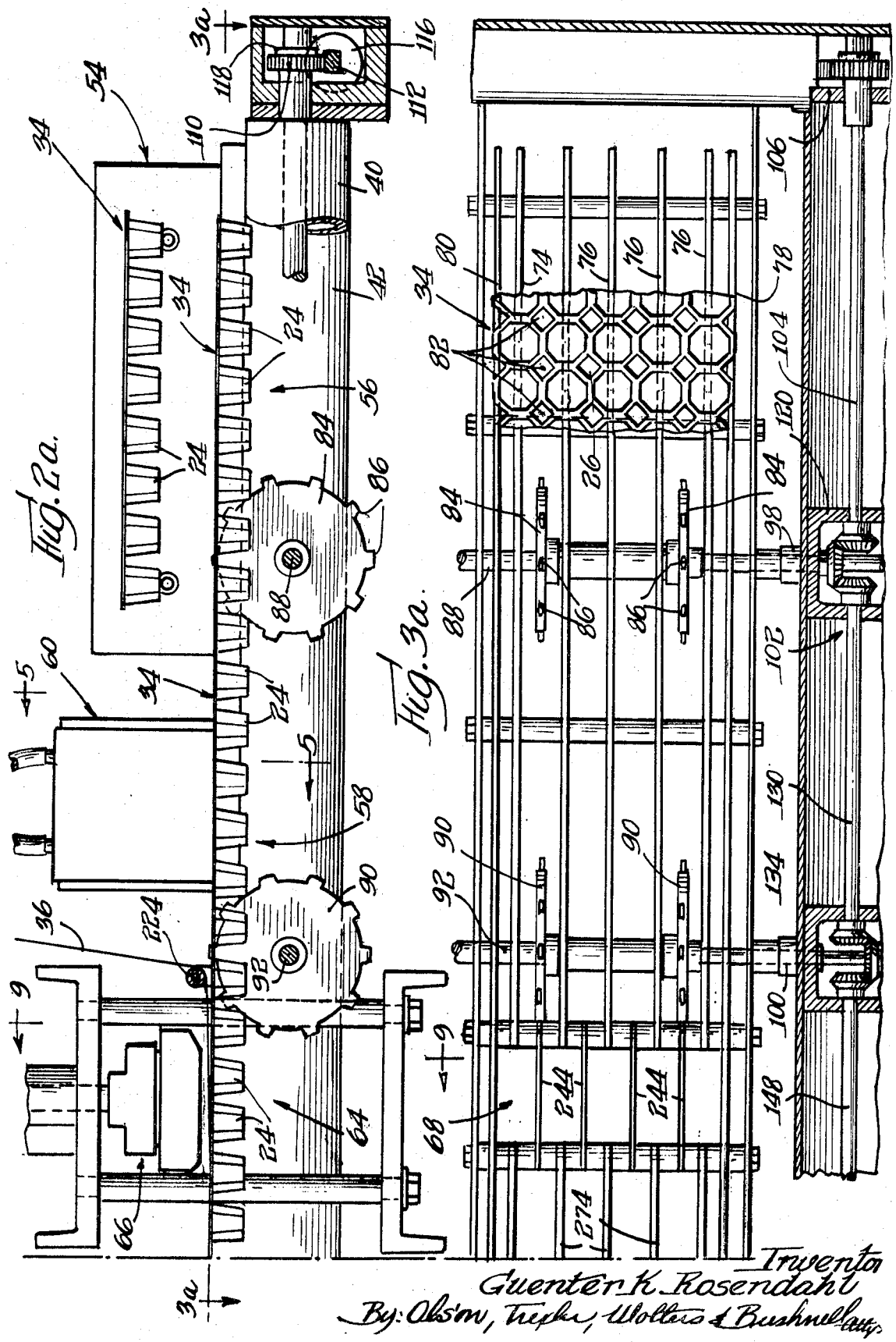

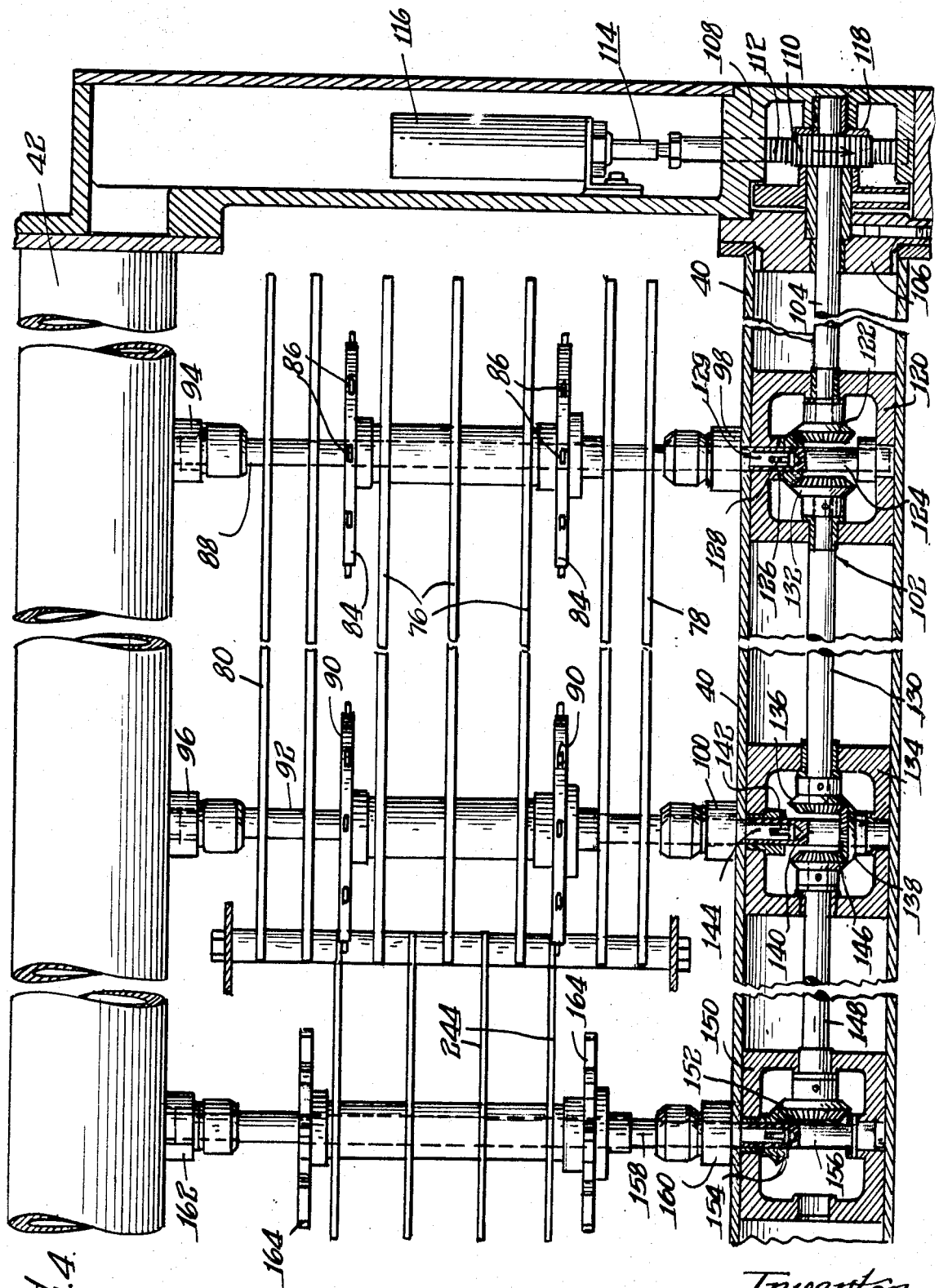

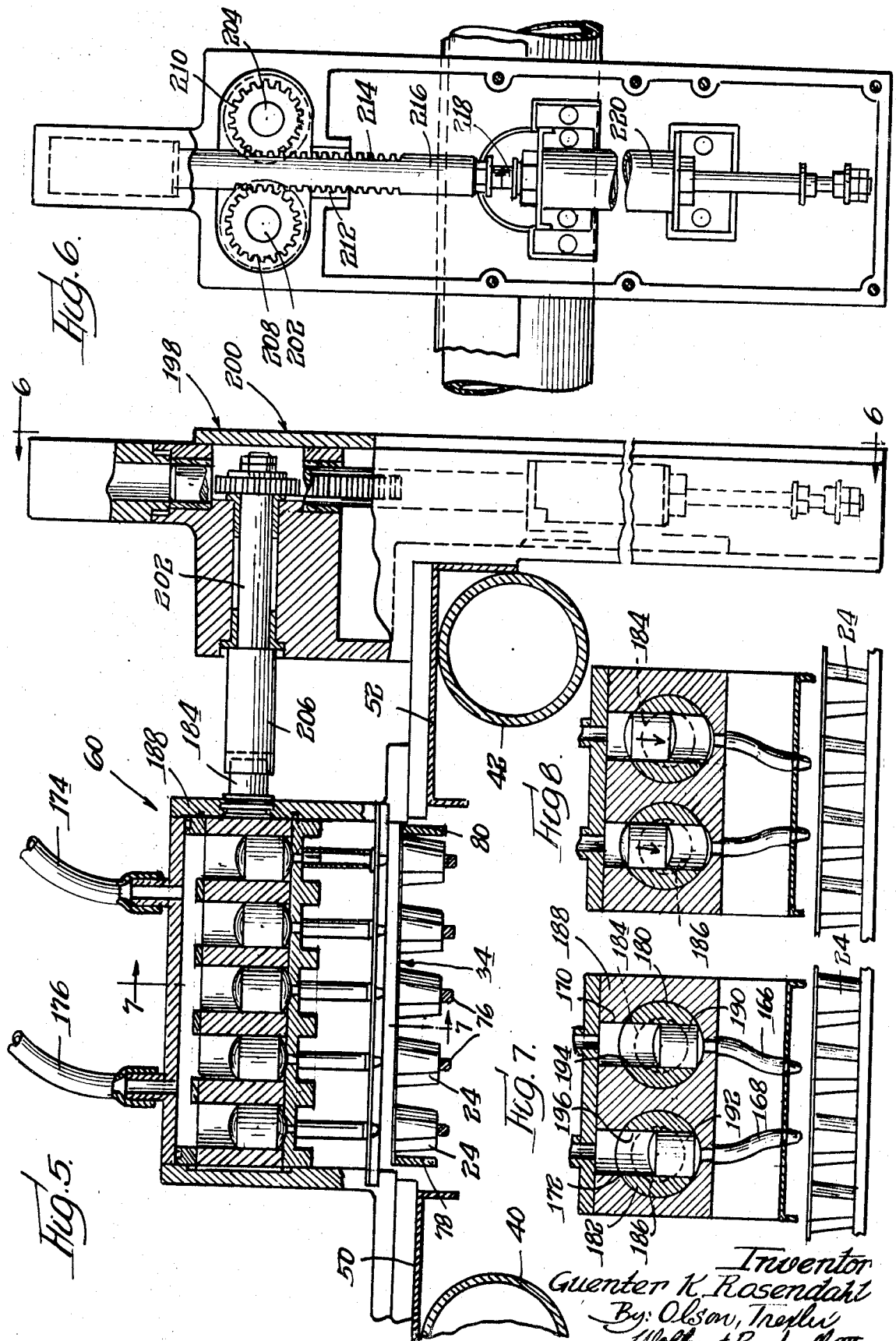

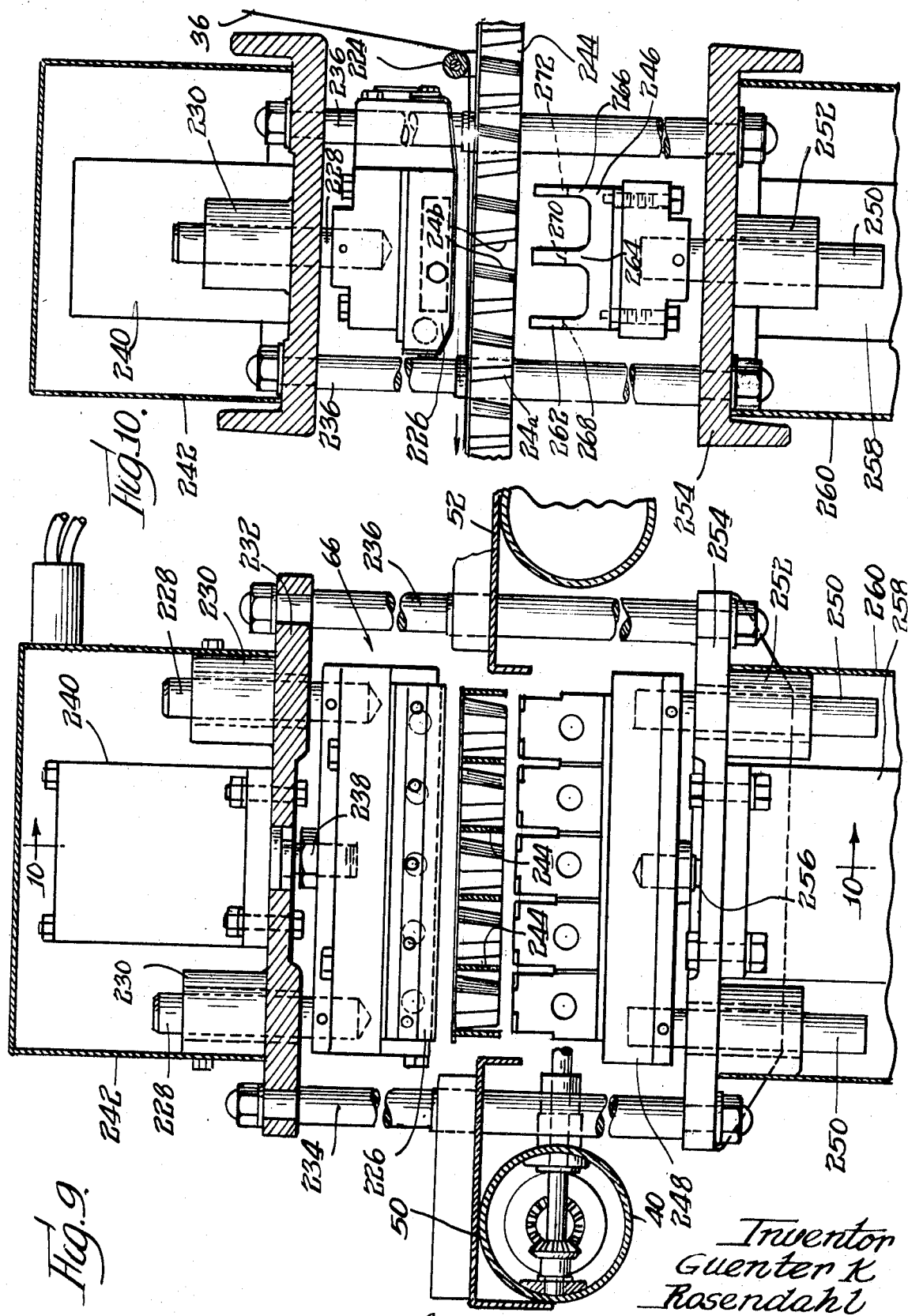

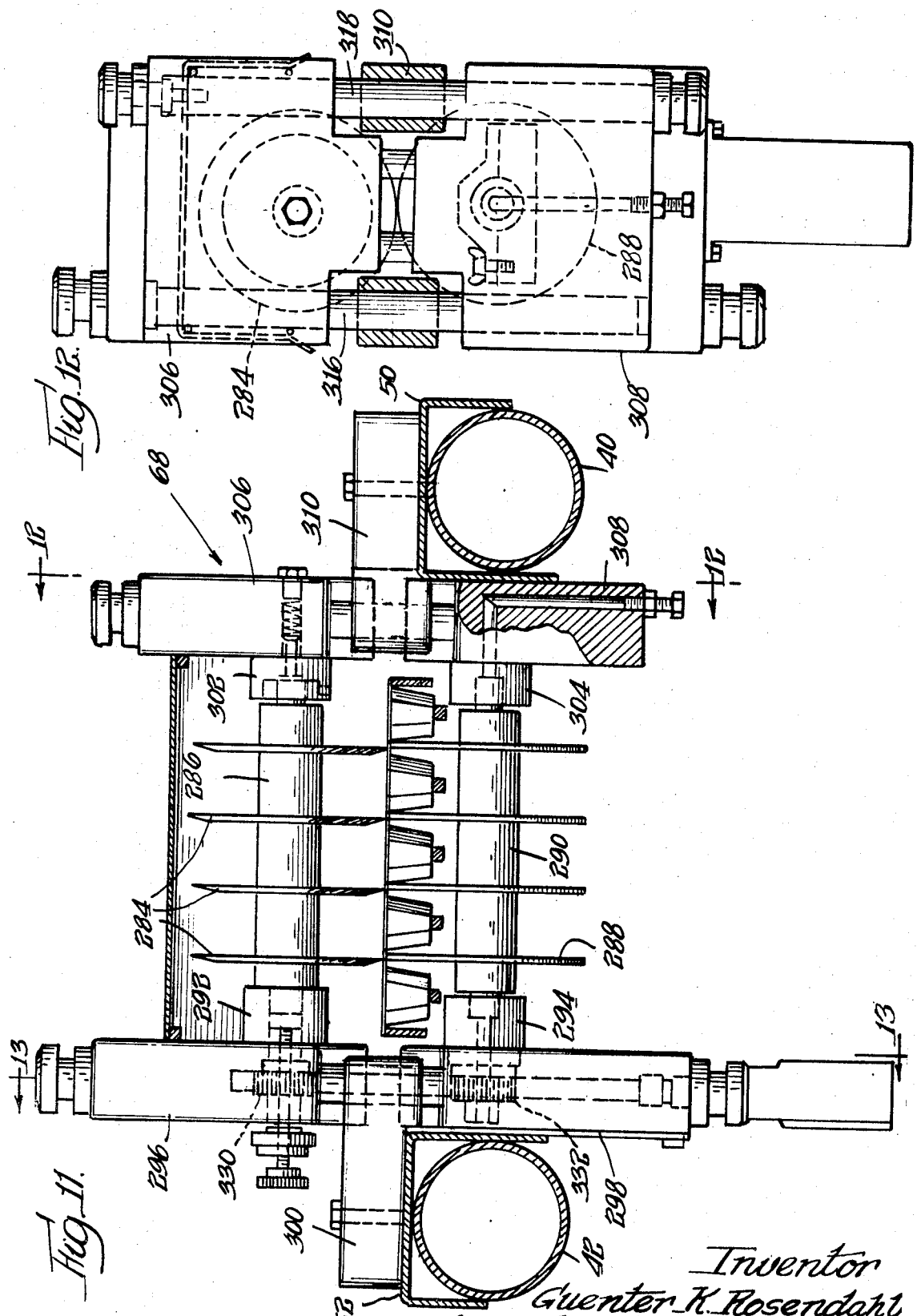

Inventor
Guenter K. Rosendahl
By: Olson, Trexler, Wolters & Bushnell attys

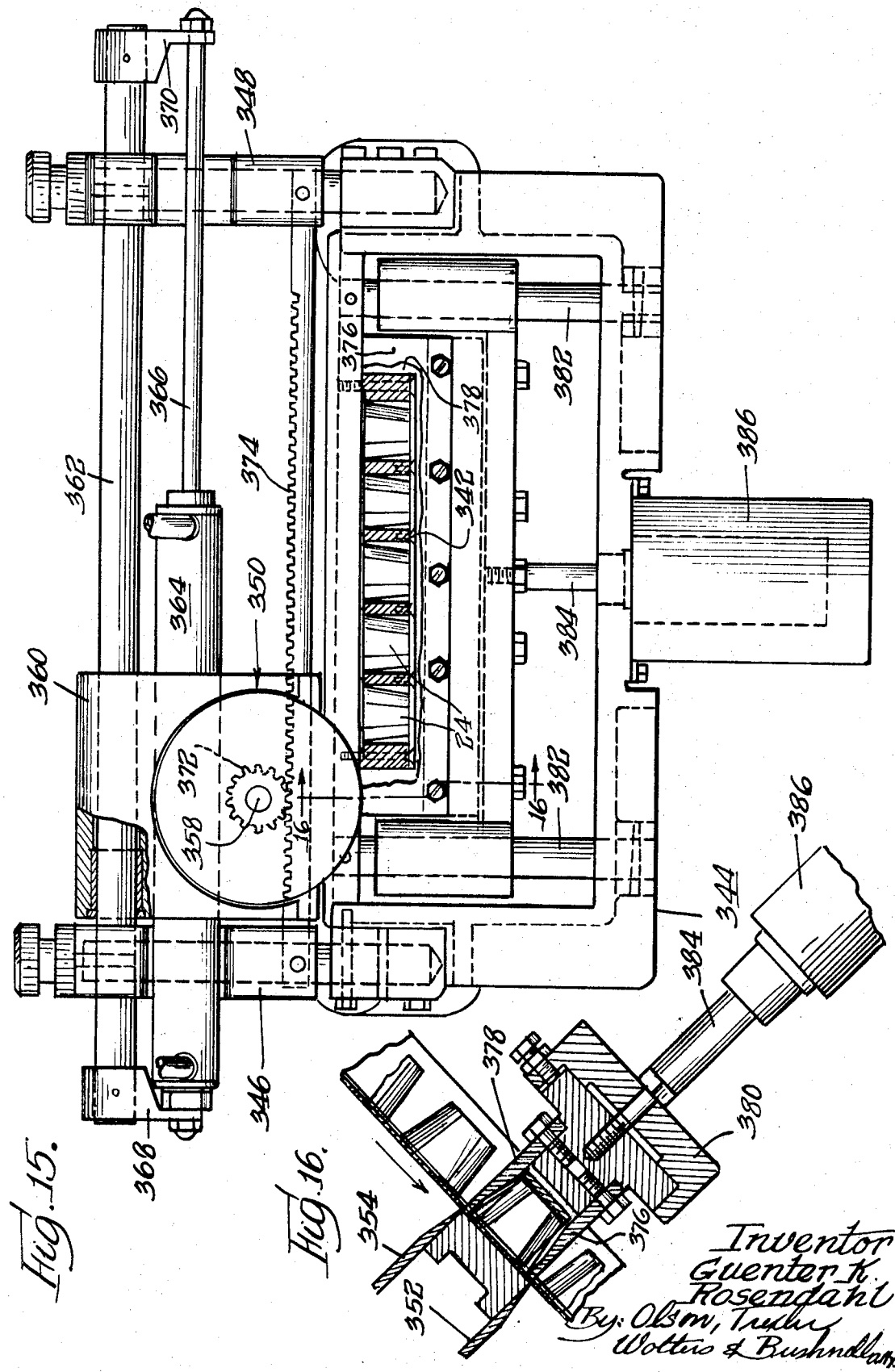

PACKAGING MACHINE

The present invention relates to a novel packaging machine, and more specifically to a novel machine for filling and sealing a plurality of packages.

While machines of the type contemplated herein may be adapted for packaging a variety of materials, they are especially suitable for handling food products such as milk or cream. Packaging machines incorporate numerous structural parts for advancing and processing containers and problems have been encountered in the construction of such machines so as to be suitable for high speed, economical and efficient handling of packages. In addition, problems have been encountered in constructing such machines in a manner such that they may be easily cleaned so as to insure sanitary conditions, particularly, when food products are to be processed.

It is an important object of the present invention to provide a novel packaging apparatus which is constructed so that the various parts and mechanisms thereof may be easily and economically assembled and serviced.

Another important object of the preset invention is to provide a novel packaging apparatus which is constructed so that it may be easily and economically cleaned and maintained in a sanitary condition so as to be especially suitable for handling food products.

Still another object of the present invention is to provide a novel apparatus of the above-described type constructed for filling and sealing a plurality of relatively small packages or containers rapidly, efficiently and economically.

Other objects and advantages of the present invention will become apparent from the following description and the accompanying drawings wherein:

FIG. 1 is a side elevational view showing an apparatus incorporating features of the present invention;

FIGS. 2 and 2a combine to provide a simplified side elevational view of the apparatus partially broken away in order to show certain features in greater detail;

FIGS. 3 and 3a combine to provide a simplified view taken generally along lines 3–3 and 3a–3a in FIGS. 2 and 2a;

FIG. 4 is an enlarged fragmentary view similar to FIG. 3a and showing certain structural features in greater detail;

FIG. 5 is an enlarged fragmentary partial sectional view taken generally along line 5–5 in FIG. 2a;

FIG. 6, is a sectional view taken along line 6–6 in FIG. 5;

FIG. 7 is a sectional view taken along line 7–7 in FIG. 5;

FIG. 8 is a sectional view similar to FIG. 7 and showing the manner in which a measuring and filling mechanism included in the apparatus functions;

FIG. 9 is a partial sectional view taken generally along line 9–9 in FIG. 2a;

FIG. 10 is a partial sectional view taken generally along line 10–10 in FIG. 9;

FIG. 11 is a fragmentary sectional view taken along line 11–11 in FIG. 2;

FIG. 12 is a view taken generally along line 12–12 in FIG. 11;

FIG. 15 is a sectional view, partially broken away, taken generally along line 15–15 in FIG. 2;

FIG. 16 is a fragmentary sectional view taken along line 16–16 in FIG. 15; and

FIG. 17 is a perspective view showing a package adapted to be processed by the apparatus of the present invention.

Figure 13:
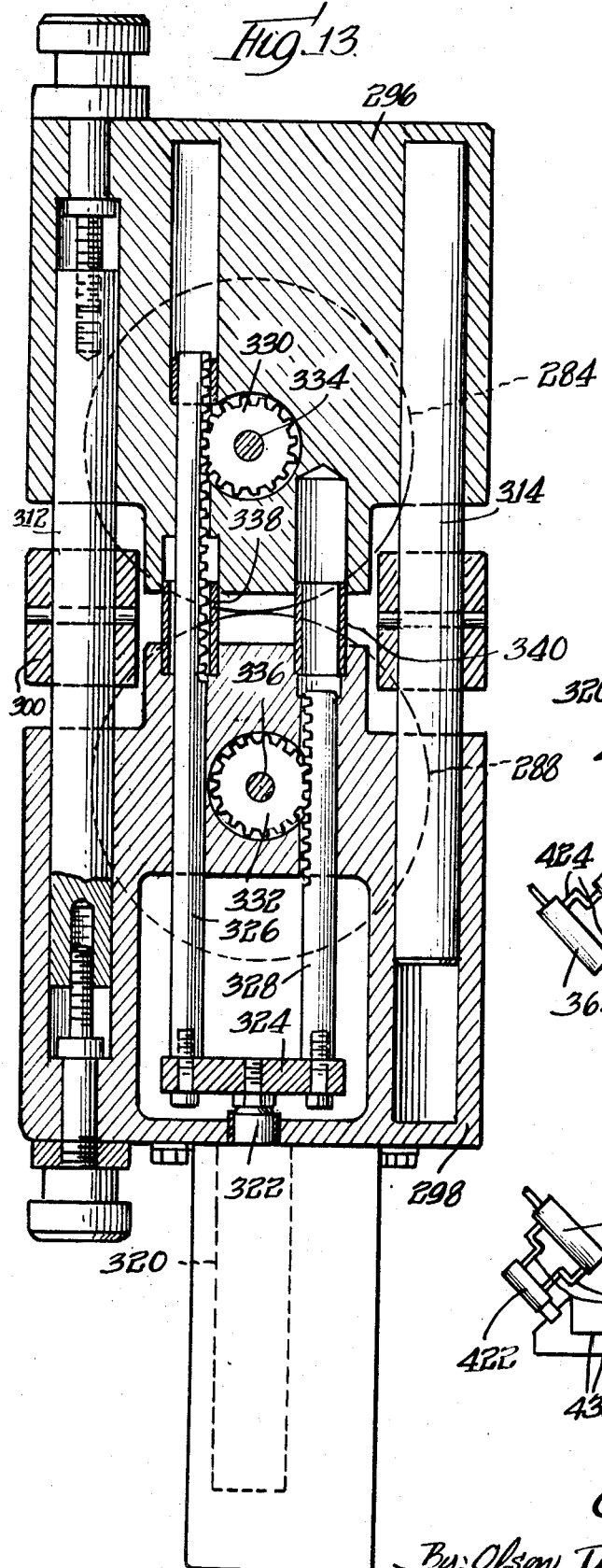
FIG. 13 is a partial sectional view taken generally along line 13–13 in FIG. 11.

Referring now more specifically to the drawings wherein like parts are designated by the same numerals throughout the figures, an apparatus 20 incorporating features of the present invention is shown in FIG. 1. The apparatus is adapted to fill and seal a plurality of packages such as the package 22 shown in FIG. 17. This package comprises a cup-shaped container 24 having a laterally extending upper marginal flange 26. A sheet or cover 28 overlies and is sealed to the flange 26. In the preferred embodiment contemplated herein, the container and the cover sheet 28 are formed from plastic and are heat sealed together. Furthermore, corner portions 30 of the container flange 26 are cut away so that corner portions 32 of the cover sheet project therebeyond. These exposed corner portions 32 may be easily grasped for tearing the sheet from the container so as to open the package.

It is contemplated that a plurality of the containers or packages 24 will initially be integrally formed from a suitable plastic sheet material and supplied to the machine 20 as a unit 34. As indicated in FIGS. 2a and 3a each package unit 34 comprises a plurality of rows of the containers 24 extending both longitudinally and transversely of the machine. The containers 24 are initially and integrally joined by their upper flanges 26. The cover 28 of the package is provided in the form of a continuous sheet 36 supplied from a roll 38 as indicated in FIGS. 1 and 2a. The sheet 36 is severed simultaneously with the cutting of the flanges 26 to separate the containers 24 after the packages have been filled and sealed in the manner to be described below.

The machine 20 comprises a frame including longitudinally extending opposite side members 40 and 42 of tubular construction. These side frame members are supported by a plurality of vertical tubular legs 44 which in turn are interconnected by longitudinally extending frame members 46 and transverse frame members 48. All of these frame members are preferably formed from tubular stock material and are connected to each other with welded joints in a manner so as to minimize the occurrence of sharp corners or crevices which might accumulate dirt or other foreign material. Furthermore, the tubular frame members are preferably formed from stainless steel or the like when the apparatus is to be used for processing food so as to increase the ease of cleaning and maintenance.

Inverted longitudinally extending channel members 50 and 52 are respectively disposed on the side frame members 40 and 42 and are welded thereto. These channel members provide flat surfaces for supporting various parts of the apparatus as described below.

As indicated in FIGS. 1 and 2a, a mechanism 54 is mounted on the frame at a first station 56 which may be designated the container loading station. The mechanism 54 is adapted to retain a stack or supply of the container units 34 and to feed or load successive units 34 onto container advancing or conveying means which will be described below. The mechanism 54 may be of known construction and need not be further described in detail.

The apparatus is provided with means which will be hereinafter described for conveying the container units 34 from the loading station 56 along a predetermined path of travel. A container filling station 58 is located along this path of travel downstream from the loading station 56. A measuring and dispensing mechanism 60 is mounted at the filling station 58 for delivering into the containers 24 quantities of a liquid or other material which is stored in a supply tank 62.

The filled containers are advanced from the filling station 58 to a sealing station 64 at which the previously mentioned roll 38 of sheet material 36 is located. The sheet material 36 is positioned over the tops of the filled containers 24 and head sealed thereto by a mechanism 66 which will be further described below.

A cutting mechanism 68 is mounted on the frame at a first cutting or severing station 70 and another cutting or severing mechanism 72 is disposed at a second severing station 74. The cutting means 68 is adapted to sever the sheet 36 and the container units 34 longitudinally with respect to the path of travel while the severing mechanism 72 is adapted to cut transversely of the path of travel so as to complete separation of the filled and sealed packages from each other.

As previously indicated, the apparatus comprises means for advancing or conveying the container units 34 from the loading station 56 along a predetermined path of travel. This means includes a plurality of guide and support rails 76 spaced between opposite side guide and support rails 78 and 80. As shown best in FIG. 5, the opposite rails 78 and 80 are adapted to engage beneath and support opposite margins of a container unit 34 while the rails 76 engage and support lower ends of the containers 24 in the individual longitudinally extending rows of the unit 34.

As shown in FIG. 3a, the unit 34 is formed so as to present apertures 82 in the flange portions 26 between each of the container portions 24. Sprocket wheels 84 having finger portions 86 engageable in the apertures 82 are mounted on a rotatable shaft 88. The sprocket wheels are adapted to be driven or indexed in timed relationship with remaining portions of the apparatus for intermittently advancing the container unit 34. In the embodiment shown, the arrangement is such that during each cycle, the unit 34 is advanced a distance corresponding to the overall length of two of the containers 24. The sprocket wheels 84 are adapted to feed the container unit toward the filling station, and an identical pair of sprocket wheels 90 mounted on a rotatable shaft 92 is provided between the filling station and the sealing station for further advancing the container unit.

As shown best in FIG. 4, the shafts 88 and 92 respectively have first ends supported in bearings 94 and 96 mounted to the side of the tubular frame member 42. Opposite ends of these shafts extend through socket elements 98 and 100 mounted on the tubular side frame member 40 for engagement with drive means 102. It is noted that the drive means 102 is housed completely within the frame of the apparatus so as to be protected from contamination by the food product being processed or other substances and facilitating the maintenance of a clean environment.

The drive means 102 comprises a first shaft 104 extending through an end member 106 plugging the end of the tubular frame member 40. An outer end portion of the shaft 104 is enclosed within a housing or a transverse frame member 108 which is mounted between ends of the side frame members 40 and 42. A pinion 110 is fixed on the outer end portion of the shaft 102 and is drivingly engaged by a rack element 112 of an actuator mechanism. Preferably the rack is connected with a piston 114 associated with a double acting air cylinder 116 which is adapted to be actuated for rotating the drive shaft 104 in the manner described below. The pinion 110 is connected with the drive shaft 104 through a ratchet mechanism 118 so that the shaft 104 is driven only in one direction as indicated by the arrows in FIG. 4.

An inner end of the drive shaft 104 extends into a hollow bearing support member 120 and carries a beveled gear 122. The member 120 rotatably supports a short transverse shaft 124 on which is mounted a beveled gear 126. The shaft 124 has a fingerlike end portion 128 engageable with a slotted end portion 129 of the shaft 88 so as to provide a driving connection therebetween. The gear 122 meshes with and drives the gear 128 so that the shaft 88 is driven in unison with the drive shaft 104.

The support member 120 also rotatably supports an end portion of a shaft 130 concentrically disposed with respect to the drive shaft 104 and carrying a beveled gear 132 which engages and is driven by the gear 128. The shaft 130 extends longitudinally of the tubular frame member 40 to another support member 134 essentially identical to the support member 120. A beveled gear 136 is fixed to the end of the shaft 130 within the support member 134 and drivingly engages another gear 138 fixed on a transverse shaft 140 rotatably mounted within the support member 134. The shaft 140 is drivingly coupled with the shaft 92 by means of complementary finger and slotted end portions 142 and 144 respectively.

The gear 138 also meshes with and drives another gear 146 fixed on an end of another longitudinally extending drive shaft 148 which is rotatably supported within the member 134. An opposite end of this shaft is supported by another member 150 which is essentially identical to the previously described support members 120 and 124. A beveled gear 152 is fixed on the shaft 148 for meshing with a complementary gear 154 fixed on a transverse shaft 156 rotatably supported within the member 150. The shaft 156 is coupled with another shaft 158 by complementary finger and slotted end portions similar to those previously described. The shaft 158 extends between socket and bearing elements 160 and 162 respectively mounted on the tubular frame members 40 and 42 at a location between the sealing station and the first severing station. Container engaging sprockets 164 are mounted on the shaft 158 for engaging and advancing the containers in a manner to be described more fully below.

It is noted that the drive means 102 is housed completely within the tubular frame member 40 so as to facilitate the maintenance of cleanly conditions. The structure of the drive means 102 is such that the various elements thereof including the members 120, 134 and 150 in the various shafts and gears associated therewith are preassembled and then inserted as a unit into the tubular frame member 40. The support members 120, 134 and 150 all have a cross-sectional configuration corresponding with the interior configuration of the tubular member 40 and dimensioned so as to enable the members 120, 134 and 150 to slide into the tubular member. Of course, the drive means 102 may also be removed as a unit from the tubular frame member for servicing or repair.

As shown in FIGS. 1 and 5, the measuring and dispensing mechanism 60 is mounted on the frame members 50 and 52 over the container supporting rails. The mechanism is adapted to fill two transverse rows of the containers 24 in a container unit 34 at one time. Thus, the mechanism 60 comprises two rows of dispensing tubes or nozzles 166 and 168 respectively communicating with rows of material or liquid measuring chambers 170 and 172. These chambers are connected by conduits 174 and 176 with a manifold pipe 178 extending from the supply tank 62.

Rotary valves 180 and 182 are respectively disposed in the chambers 170 and 172 and are respectively connected with drive shafts 184 and 186 projecting from a side of housing means 188 of the dispensing mechanism. Freely slidable shuttle valves or pistons 190 and 192 are disposed in passageways 194 and 196 through the valve elements 180 and 182. The arrangement is such that when the parts are in the position shown in FIGS. 5 and 7, upper end portions of the passageways 194 and 196 are filled with a measured quantity of liquid or material to be dispensed. Then upon rotation of the valve members to the position shown in FIG. 8, the measured quantity of liquid is dispensed through the tubes 166 and 168. As the material flows out through the tubes, the pistonlike valve elements 191 and 192 move downwardly as indicated by the arrows in FIG. 8 to again block the dispensing tubes and permit another measured quantity of liquid to fill the upwardly exposed end portions of the valve member passageways.

An actuator mechanism or drive means 198 is mounted on the frame member 52 for operating the dispensing mechanism 60. This drive means includes a housing structure 200 for substantially completely enclosing the moving parts and constructed for facilitating cleaning and maintenance of the apparatus. Drive shafts 202 and 204 are rotatably mounted within the housing structure 200 and are respectively connected with the valve shafts 184 and 186 of the dispensing mechanism by suitable coupling devices 206. Pinions 208 and 210 are fixed on the rotatable shafts 202 and 204 and are respectively engaged by rack teeth 212 and 214 formed on opposite sides of a rack member 216 mounted for reciprocable movement within the housing structure 200. The rack member is connected with a piston rod 218 of an air or fluid cylinder 220 which is adapted to be actuated in the manner described below for oscillating the valve members of the dispensing mechanism in timed relationship with the movement of the containers through the apparatus.

The filled containers move from the mechanism 60 to the closing and sealing station 64. As shown in FIGS. 1, 9 and 10, the mechanism 66 at the station 64 is constructed for guiding the strip 36 of sheet material into a position over the upper ends of the filled containers and then heat sealing the sheet to the containers. More specifically, the strip 36 extends around guides 222 and 224 to a position over the filled containers. Referring particularly to FIG. 10, it is seen that the strip 36 has been already sealed to containers designated 24a and is arranged over a pair of rows of containers designated 24b in position to be secured thereto. It will be observed that the feeding movement of the containers 24a along the path of travel also causes the strip 36 to be pulled or fed into position over the subsequent containers.

The sealing mechanism 66 comprises a heated pressure pad 226 supported for reciprocable movement by guide rods 228 slidable in bearings 230 mounted on a frame member 232. This frame member is supported above the path of travel of the containers by rods 234 and 236 which are in turn mounted on the frame members 50 and 52. The pressure pad 226 which is electrically or otherwise heated is connected with a piston rod 238 cooperable with a double acting air cylinder 240 mounted on the frame member 232. A housing 242 surrounds the cylinder 240, guide rods 228 and bearings 230 in order to facilitate cleaning of the apparatus.

The pressure pad 226 is adapted to be shifted downwardly from the position shown in FIGS. 9 and 10 upon actuation of the air cylinder 240 for pressing the sheet 36 against the upper flange portion 26 of the containers. In order to support or backup there flange portions during the pressing and heat sealing operation, longitudinally extending support rails 244 are provided as shown in FIGS. 9 and 3a. The previously mentioned guide rails 76 are discontinued at the sealing station, but the rails 78 and 80 are continued across the station for supporting opposite outer margins of the container unit.

The rails 78, 80 and 244 provide support for longitudinally extending sections. Additional support is provided for transversely extending portions of the containers. More specifically, a backup or pressure member 246 is mounted beneath the path of travel of the containers in opposing relationship to the pressure pad 226 as shown best in FIGS. 9 and 10. The member 246 is mounted on a cross head 248 which is supported by vertical guide rods 250 slidably disposed in bearing units 252. These bearing units are mounted on a frame member 254 which is secured to lower end portions of the previously mentioned rods or frame members 234 and 236 which project beneath the frame members 50 and 52. The pressure member 246 is adapted to be raised from the position shown in FIGS. 9 and 10 into engagement with the containers by means of a piston rod 256 operatively associated with an air cylinder 258 which is secured beneath the frame member 254. A housing 260 similar to the previously mentioned housing 244 encircles the cylinder 258, guide rods 250 and bearings 252 for preventing contamination of these elements and facilitating cleaning of the apparatus.

The pressure member 246 presents upstanding flanges or web portions 262, 264, and 266 having pockets therebetween for receiving the containers when the pressure member is moved to its raised position. These web portions are respectively provided with slots 268, 270 and 272 for accommodating the longitudinal support rails when the pressure member is raised from its lower position to the upper position at which the upper edges of the flanges or webs 262—266 are substantially coplanar with the upper edges of the support rails 78, 80 and 244. As will be understood, sealing of the sheet 36 on the upper margins of the containers 24 is accomplished by actuating the cylinders 240 and 258 so that the pressure members 226 and 246 clamp the sheet and container flanges therebetween for accomplishing the sealing of the sheet to container flanges along longitudinally and transversely extending lines corresponding to the longitudinally extending support rails and the transversely extending webs or flanges.

The longitudinally extending support rails 244 terminate at the end of the closing and sealing station and additional guide bars or rails 274 are provided for supporting the filled containers. These rails correspond to the previously mentioned rail 76 and are adapted to engage lower ends of the containers.

The containers leaving the filling and sealing station are engaged and driven forwardly along their path of travel by the previously mentioned drive wheels or sprockets 164 which are located between the sealing station 64 and the severing station 70 as shown in FIGS. 1, 2 and 3. As indicated earlier, the drive wheels or sprockets 164 differ from the drive wheels or sprockets 84 and 90. More specifically, the sprockets 84 and 90 are provided with teeth or finger portions engageable in the apertures formed in the container unit 34. However, these apertures are closed when the sheet 36 is applied to the containers at the station 64. Therefore, the sprocket wheels 164 are provided with relatively narrow finger elements or teeth 276 with deep pockets 278 therebetween.

The construction and arrangement of the sprocket wheels 164 is such that the teeth or finger elements 276 are adapted to project between containers 24 in a container unit 34 and engage the slides thereof for driving the container units forwardly along their path of travel. As shown best in FIG. 2, the pockets 278 are adapted to receive the lower ends of the containers 24 therein and the finger elements are undercut as at 280 or, in other words, are provided with enlarged knobs 282 at their outer ends for insuring driving engagement with the containers while providing sufficient clearance to avoid interference with the lower ends of the container.

The cutting mechanism 68 at the severing station 70 is shown in FIGS. 1, 2, 11, 12 and 13. This mechanism comprises a plurality of circular knife blades 284 mounted on a shaft 286 above the packages and cooperable discs 288 mounted on a rotary shaft 290 below the packages. First ends of the shafts are supported in bearing units 292 and 294 mounted on housing members 296 and 298 which in turn are secured to a base member 300 detachably affixed to the frame member 52. Opposite ends of the shafts are rotatably supported in bearing units 302 and 304 mounted on members 306 and 308 which in turn are secured to a base member 310 affixed to the frame member 50.

As shown in FIG. 13, the housing members 296 and 298 are supported for adjustment toward and away from each other on guide rods 312 and 314 which extend through and are affixed with respect to the base member 300. The members 306 and 308 are similarly mounted for adjustment toward and away from each other on rods 316 and 318 affixed to the base member 310 as shown in FIG. 12. This arrangement enables the cutter discs 284 and 288 to be adjusted relative to each other and to the packages to be severed.

The severing mechanism 68 is provided with drive or actuating means for rotating the cutter discs in timed relationship with the movement of the packages along the path of travel. This actuator or drive means is shown best in FIGS. 7 and 13 and comprises an air cylinder 320 for actuating a piston rod 322 secured to a cross head 324. Elongated rack members 326 and 328 are fixed to the cross head respectively for engaging and driving pinions 330 and 332 fixed on shaft portions 334 and 336 which are drivingly connected with the rotatable cutter shafts 286 and 290. As shown in FIG. 13, tubular sleeves 338 and 340 extend between the housing members 296 and 298 and are slidably received in complementary bores in the housing member 296 for assuring complete enclosing of the drive mechanism.

It will be appreciated that the containers leaving the severing station 70 are separated from each other along lines extending longitudinally of the path of travel. Each longitudinally extending row of interconnected containers then slides down inclined discharge guide bars 342 which are arranged as shown in FIGS. 2 and 3 so as to engage beneath the end flanges of the containers. As previously indicated, the containers are then severed transversely of the path of travel by the mechanism 72 at the severing station 74 and the individual containers then slide freely down the remainder of the guide bars 342 to suitable means, not shown, at the discharge end of these guide bars.

The severing means 72, as shown in FIGS. 1, 2, 15 and 16, comprises a generally U-shaped frame 344 mounted beneath the guide bars 342 and having opposite upstanding side or arm portions 346 and 348 extending upwardly along opposite sides of the guide bars. A rotary knife structure 350 is mounted for traversing the paths of travel of the packages and separating successive packages from each other. In the embodiment shown, the knife structure includes blades 352 and 354 (FIG. 16) fixed on a shaft 358 rotatably mounted in a slide or carriage 360. The carriage 360 is slidably mounted on a bar 362 extending between the upstanding arm portions 346 and 348 and is adapted to be actuated back and forth therebetween by a double-acting air cylinder 364 fixed to the carriage 360 and cooperable with a piston on a piston rod 366 which is fixed between brackets 368 and 370 at opposite ends of the rod 362.

The knife shaft 358 carries a pinion 372. This pinion meshes with a rack 374 which is secured between the upstanding frame arms 346 and 348. Thus, upon operation of the air cylinder 364, the carriage is moved toward the right as viewed in FIG. 15 and the rotary knife structure 350 is rotated for severing the packages from each other.

Backup blades 376 and 378 are provided for cooperating with the rotary blades 352 and 354 respectively for insuring proper severing of the packages. These blades are as shown in FIGS. 15 and 16 adapted to extend entirely across the path of travel of the containers and are mounted on a cross head 380 which is adapted to be raised and lowered. The cross head is supported by guide rods 382 and is connected with a piston rod 384 associated with and adapted to be actuated by an air cylinder 386.

The blades 376 and 378 are slotted for accommodating the rails 242 whereby the blades are adapted to be located in the raised position shown in FIG. 15 for cooperation with the rotary blade structure 350 during a severing operation. At the completion of the severing operation, the cylinder 386 is actuated for lowering the blades 376 and 378 sufficiently to clear the lower ends of the packages and to permit the packages to slide down the guide bars 342 and further to permit successive packages to be advanced to the severing station.

The apparatus is provided with a suitable source of air or fluid under pressure, not shown, for actuating the previously mentioned fluid motors or air cylinders. Furthermore, control valves and electric circuit control means are provided for causing the various feeding, filling, sealing, and severing mechanisms to be operated in timed relationship. The structure is such that the packages are intermittently advanced along the path of travel and during each cycle, two transverse rows of packages are advanced to each of the stations. In other words, the packages are advanced in increments of two so that during each cycle, two transverse rows are filled, two transverse rows are sealed, and two transverse rows are severed at each of the severing stations.

Figure 14:
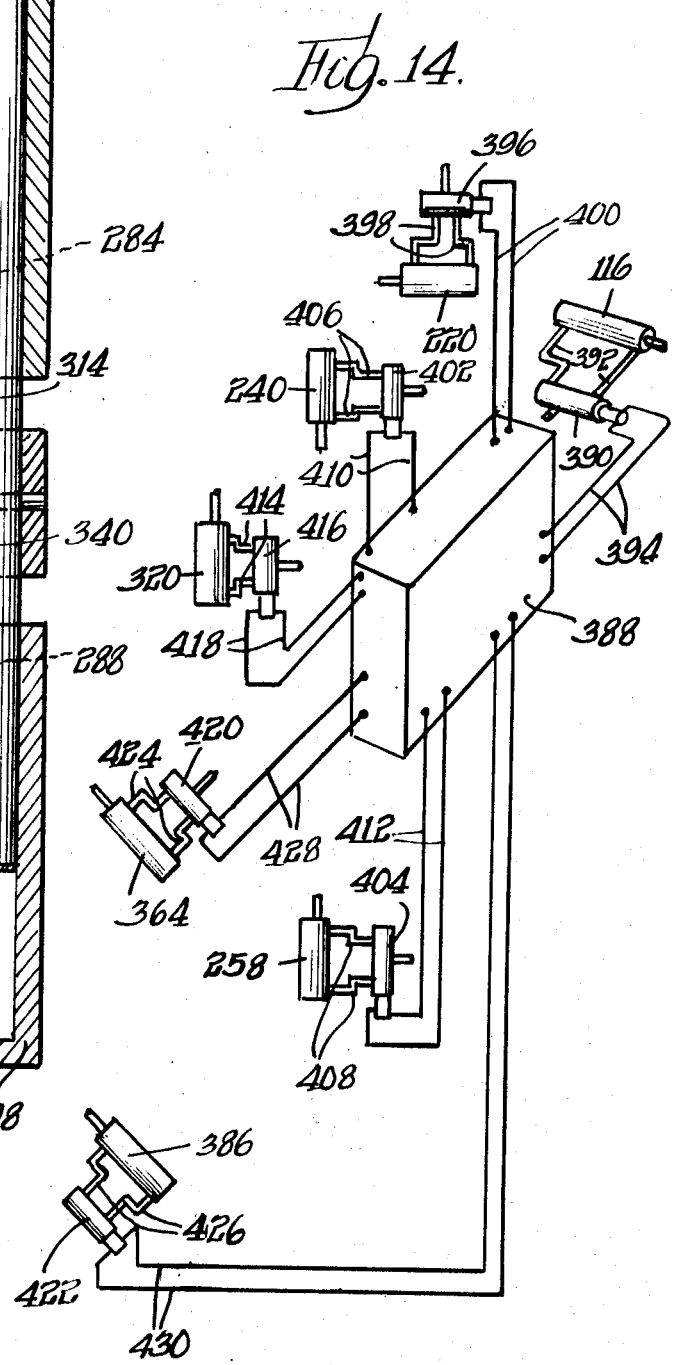
FIG. 14 is a schematic view showing a control circuit included in the apparatus.

Simplified actuating and control means for operating the various components of the machine in the manner described above is schematically shown in FIG. 14. This means comprises a control panel 388 mounted on the machine frame as shown in FIG. 1 and containing switches and relays of known construction. The control panel is connectable with a suitable source of electrical energy. Solenoid-operated air valves are connected with each of the aforementioned cylinders and also with the switch and relay structure of the control panel. Thus, valve 390 is connected by conduits 392 with the cylinder 116 and by wires 394 with the control panel. Valve 396 is connected by conduits 398 with the cylinder 220 and by wires 400 with the control panel. Additional valves 402 and 404 are connected with the cylinders 240 and 258 respectively at the sealing station by conduits 406 and 408. Solenoids of these valves are respectively connected by wires 410 and 412 with the control panel.

The cylinder 320 at the first severing station is connected by conduits 414 with a control valve 416 having its operating solenoid connected by wires 418 to the control panel. Additional valves 420 and 422 are provided for the cylinders 364 and 386 respectively at the second severing station. These valves are respectively connected by conduits 424 and 426 with their associated cylinders and by wires 428 and 430 with the control panel.

While a preferred embodiment of the present invention has been shown and described herein, numerous changes may be made without departing from the spirit and scope of the appended claims.

I claim:

1. An apparatus for packaging a food product comprising frame means including opposite side members, guideway means on said frame means for supporting a plurality of interconnected containers arranged in transverse and longitudinally extending rows for movement along a path of travel, a plurality of shafts rotatably mounted at spaced intervals along said path of travel and extending between said side frame members, means on said shafts for engaging and moving said containers along said path of travel, one of said side frame members comprising a substantially closed tubular member into which end portions of said shafts extend, and drive means disposed substantially completely within said tubular member and connected with said shafts for driving said shafts.

2. An apparatus for packaging a food product comprising frame means including opposite side members, guideway means on said frame means for supporting a plurality of interconnected containers arranged in transverse and longitudinally extending rows for movement along a path of travel, a plurality of shafts rotatably mounted at spaced intervals along said path of travel and extending between said side frame members, means on said shafts for engaging and moving said containers along said path of travel, one of said side frame members comprising a substantially closed tubular member into which end portions of said shafts extend, and drive means disposed within said tubular member and connected with said shafts for driving said shafts, said path of travel extending past a container filling station, a container closing and sealing station, a first severing station, and a second severing station, said apparatus comprising food dispensing means mounted at said filling station and including an actuating shaft, housing means mounted on said frame means and receiving an end portion of said last mentioned shaft, and drive means enclosed within said housing means and connected with said last mentioned shaft for actuating said dispensing means.

3. An apparatus, as defined in claim 2, which includes means on said frame means at said closing and sealing station for sealing closure means on said containers, said sealing means including a pressure member mounted for movement toward and away from said containers with closure means thereon, a backup member opposite said pressure member and mounted for opposite movement toward and away from said containers, actuator means connected with each of said members, and housing means on said frame means enclosing each of said last named actuator means.

4. An apparatus, as defined in claim 2, which includes first severing means on said frame means at said first severing station for severing sealed packages from each other longitudinally of the path of travel and providing a plurality of longitudinally extending series of interconnected packages, said first severing means comprising complementary rotary cutter members carried by rotatable shafts above and below said path of travel, actuating means on said frame means and connected with said last named shafts, and housing means on said frame means substantially enclosing said last named actuator means.

5. An apparatus, as defined in claim 4, which includes second severing means on said frame means at said second severing station for severing the sealed packages from each other transversely of said path of travel.

6. An apparatus, as defined in claim 5, which includes means for operating all of said actuating and drive means intermittently for indexing a predetermined number of the containers to each of said stations during each cycle.

7. An apparatus for packaging a product into containers having upper ends closed by sheet material comprising frame means, guide means on said frame means for directing a plurality of initially interconnected containers arranged in longitudinally and transverse extending rows along a path of travel extending from a loading station past a filling station, a sealing station, a first severing station and a second severing station, feeding means on said frame means and spaced along said path of travel for engaging and advancing the containers, said feeding means including shafts extending transversely of said frame means, drive means connected with said feeding means, shafts for driving said feeding means, and housing means enclosing said drive means, said housing means comprising an elongated tubular member providing a side member of said frame means, said drive means including a unit disposed within said tubular member, said unit including a plurality of support members respectively disposed adjacent ends of said shafts, longitudinally extending drive shafts between said support members, transverse drive shafts rotatably mounted within said support members and respectively connected with said first mentioned shafts, and meshing gears within said support members and respectively fixed on the longitudinally extending and transversely extending drive shafts.

8. An apparatus, as defined in claim 7, wherein said frame means comprises opposite side frame members including said tubular frame member, housing means extending between said side frame members, and actuating means including a fluid operated cylinder mounted in said housing means and drivingly connected with a longitudinally extending drive shaft of said driving means.

9. An apparatus, as defined in claim 7, which includes a material dispensing unit mounted on said frame means at said filling station and comprising a shaft, actuating means including a fluid operated cylinder drivingly connected with said shaft, and housing means mounted on said frame means and enclosing said actuating means.

10. An apparatus, as defined in claim 7, which includes means mounted at said sealing station for directing sheet material over upper ends of the containers, and additional means mounted at said sealing station for sealing said sheet material against said containers, said sealing means comprising upper and lower complementary pressure members, actuators respectively connected with said upper and lower pressure members for shifting said members to and from pressure applied in sealing positions, and housing means mounted on said frame means and enclosing said actuators.

11. An apparatus, as defined in claim 7, which includes cutter means at said first severing station for severing the packages from each other along lines extending longitudinally of the path of travel, said cutter means comprising complementary rotary elements respectively mounted on shaft means disposed above and below said path of travel, actuator means operatively connected with both of said last mentioned shaft means, and housing means mounted on said frame means substantially enclosing said actuator means.

12. An apparatus, as defined in claim 11 which includes additional cutter means disposed at said second severing station and including a severing member mounted for movement transversely of said path of travel.

13. An apparatus, as defined in claim 7, wherein said frame means comprises tubular opposite upper side frame members including said first mentioned tubular member, a plurality of tubular substantially vertical side frame members respectively having upper ends conforming to and welded to said side frame members and depending therefrom, and a plurality of generally horizontally disposed frame members extending between lower end portions of said vertical frame members and having ends conforming to and welded to sides of said vertical tubular frame members whereby to minimize the occurrence of sharp corners in said frame means for facilitating cleaning of the frame means.

UNITED STATES PATENT OFFICE
CERTIFICATE OF CORRECTION

Patent No. 3,574,270　　　　　　　　Dated April 13, 1971

Inventor(s) Guenter Rosendahl

It is certified that error appears in the above-identified patent and that said Letters Patent are hereby corrected as shown below:

Column 1, line 21, change "preset to --present--.
Column 2, line 63, change "head" to --heat--.
Column 4, line 1, change "124" to --134--.
Column 5, line 29, change "there" to --these--.
Column 6, line 24, change "slides" to --sides--.

Signed and sealed this 26th day of October 1971.

(SEAL)
Attest:

EDWARD M. FLETCHER, JR.　　　　　ROBERT GOTTSCHALK
Attesting Officer　　　　　　　　Acting Commissioner of Patent